US008572577B2

(12) United States Patent
Bates et al.

(10) Patent No.: US 8,572,577 B2
(45) Date of Patent: Oct. 29, 2013

(54) MONITORING CHANGES TO DATA WITHIN A CRITICAL SECTION OF A THREADED PROGRAM

(75) Inventors: Cary L. Bates, Rochester, MN (US); Victor J. Gettler, Lexington, KY (US)

(73) Assignee: International Business Machines Corporation, Armonk, NY (US)

( * ) Notice: Subject to any disclaimer, the term of this patent is extended or adjusted under 35 U.S.C. 154(b) by 1253 days.

(21) Appl. No.: 12/143,101

(22) Filed: Jun. 20, 2008

(65) Prior Publication Data
US 2009/0320001 A1    Dec. 24, 2009

(51) Int. Cl.
G06F 9/44    (2006.01)

(52) U.S. Cl.
USPC .............................. 717/129; 717/124; 717/127

(58) Field of Classification Search
USPC .......................................................... 717/129
See application file for complete search history.

(56) References Cited

U.S. PATENT DOCUMENTS

| | | | |
|---|---|---|---|
| 6,286,130 B1 * | 9/2001 | Poulsen et al. ................ | 717/119 |
| 6,378,124 B1 * | 4/2002 | Bates et al. .................... | 717/129 |
| 6,415,433 B1 * | 7/2002 | Callahan et al. .............. | 717/160 |
| 6,587,967 B1 | 7/2003 | Bates et al. | |
| 6,634,020 B1 | 10/2003 | Bates et al. | |
| 6,681,345 B1 * | 1/2004 | Storino et al. .................. | 714/42 |
| 6,748,556 B1 * | 6/2004 | Storino et al. .................. | 714/42 |
| 6,772,367 B1 * | 8/2004 | Tarafdar et al. ................ | 714/11 |
| 6,957,436 B1 * | 10/2005 | Mihic ............................ | 718/107 |
| 7,120,762 B2 | 10/2006 | Rajwar et al. | |
| 7,178,133 B1 * | 2/2007 | Thekkath ...................... | 717/128 |
| 7,206,903 B1 | 4/2007 | Moir et al. | |
| 7,506,318 B1 * | 3/2009 | Lindo et al. ................... | 717/130 |
| 7,673,181 B1 * | 3/2010 | Lindo et al. ................ | 714/38.13 |
| 7,716,645 B2 * | 5/2010 | Dolby et al. ................... | 717/126 |
| 7,823,135 B2 * | 10/2010 | Horning et al. ............... | 717/127 |
| 7,958,497 B1 * | 6/2011 | Lindo et al. ................... | 717/128 |
| 7,971,248 B2 * | 6/2011 | Nagpal et al. .................. | 726/22 |
| 8,079,019 B2 * | 12/2011 | Lindo et al. ................... | 717/129 |
| 2005/0262301 A1 | 11/2005 | Jacobson et al. | |
| 2005/0289514 A1 * | 12/2005 | Hooper et al. ................ | 717/124 |

(Continued)

OTHER PUBLICATIONS

John L. Donaldson. 2008. Implementation of threads as an operating systems project. In Proceedings of the 39th SIGCSE technical symposium on Computer science education (SIGCSE '08). ACM, New York, NY, USA, 187-191.*

(Continued)

*Primary Examiner* — Wei Zhen
*Assistant Examiner* — Matthew Brophy
(74) *Attorney, Agent, or Firm* — Yee & Associates, P.C.; Arthur J. Samodovitz

(57) ABSTRACT

A method, system and program product for monitoring changes to a variable within a critical section of a threaded program. The method includes establishing, using a debugging tool, a watch for monitoring changes to a variable that occur outside of the critical section and executing a portion of the threaded program with a debugger. Further, the method includes determining, using the tool, whether or not a thread has executed a start breakpoint set for the critical section, if the thread has executed the start breakpoint set, determining whether or not the thread has executed an end breakpoint set for the critical section, and if the thread has not executed the end breakpoint set, displaying any watches triggered responsive to updates to the variable that occur outside of the critical section, such that, only updates to the variable that occur outside of the critical section will trigger the displaying.

17 Claims, 5 Drawing Sheets

(56) References Cited

U.S. PATENT DOCUMENTS

2007/0271450 A1  11/2007  Doshi et al.
2008/0127035 A1* 5/2008  Lev et al. ............... 717/100
2008/0215768 A1* 9/2008  Reid et al. .............. 710/22
2008/0282229 A1* 11/2008 Kim et al. ............... 717/124
2009/0254883 A1* 10/2009 Munson et al. .......... 717/124

OTHER PUBLICATIONS

E. Vallejo, M. Galluzzi, A. Cristal, F. Vallejo, R. Beivide, P. Stenstrom, J. E. Smith, and M. Valero, "Implementing Kilo-Instruction Multiprocessors," in Inter. Conf. on Pervasive Systems, Jul. 2005.*

U. Banerjee, B. Bliss, Z. Ma, and P. Petersen. Unraveling Data Race Detection in the Intel R Thread Checker. Presented at the First Workshop on Software Tools for Multi-core Systems (STMCS), in conjunction with IEEE/ACM International Symposium on Code Generation and Optimization (CGO), Mar. 26, 2006, Manhattan, New York, NY.*

Novillo, E.; Lu, P.; , "On-line debugging and performance monitoring with barriers," Parallel and Distributed Processing Symposium., Proceedings 15th International , vol., No., pp. 8 pp., Apr. 2001.*

Dinning, Anne Schonberg, Edith "Detecting access anomalies in programs with critical sections" Workshop on Parallel & Distributed Debugging: Proceedings of the 1991 ACM/ONR workshop on Parallel and distributed debugging; May 20-21, 1991. 1991.).*

Hood, Robert, Ken Kennedy, and John Mellor-Crummey. "Parallel program debugging with on-the-fly anomaly detection." Supercomputing'90. Proceedings of. IEEE, 1990.*

Novillo, Ernesto, and Paul Lu. "On-line debugging and performance monitoring with barriers." Parallel and Distributed Processing Symposium., Proceedings 15th International. IEEE, 2001.*

Ronsse, Michiel, Koen De Bosschere, and Jacques Chassin de Kergommeaux. "Execution replay and debugging." arXiv preprint cs/0011006 (2000).*

* cited by examiner

CRITICAL SECTION WATCH TABLE

| 402 WATCH # | 404 ADDRESS | 406 LENGTH | 408 CS# | |
|---|---|---|---|---|
| 1 | 7FD13200 | 20 | 0 | ~420 |
| 2 | 7FA13100 | 4 | 1 | ~430 |
| | | | | |

FIG. 4

CRITICAL SECTION RECORD LIST

| | 502 CS# | 504 MODULE | 506 START | 508 END | 510 THREAD LIST |
|---|---|---|---|---|---|
| 530 | 1 | Foo | 23 | 41 | |
| | | | | | |

| 512 THREAD # | 514 NEXT |
|---|---|
| 3253 | |

FIG. 5

BREAK POINT TABLE

| 602 ADDRESS | 604 LINE # | 606 SAVED OP CODE | 608 IS START | 610 IS END | 612 CS# | |
|---|---|---|---|---|---|---|
| 712498A1 | 23 | LOAD | YES | NO | 1 | ~620 |
| 712598B2 | 41 | STR | NO | YES | 1 | ~630 |
| 722698D2 | 92 | STR | NO | NO | 0 | ~640 |
| | | | | | | |

FIG. 6

MONITORING CHANGES TO DATA WITHIN A CRITICAL SECTION OF A THREADED PROGRAM

FIELD OF THE INVENTION

The present invention relates to computer systems and software, and more specifically to an automated technique for monitoring changes to data, for instance, a variable, within a critical section of a threaded program being debugged.

BACKGROUND OF THE INVENTION

Multi-threaded software provides multiple execution "threads" which act like independently executing programs. An advantage to such multi-threaded software is that each thread can be assigned to an independent processor, or to a single processor that provides multi-threaded execution so that the threads may be executed in parallel for improved speed of execution. Each of the threads in a multi-threaded program may need to modify common data shared among the threads. However, if the threads are not coordinated in their use of the common data, serious errors can occur. Typically, a programmer uses another computer program commonly referred to as a "debugger" to "debug" a multi-threaded program under development to ensure that all aspects of a multi-threaded program employed are operational, and that any critical situations that may occur are not missed during debugging. As such, there is a need for programmers to effectively identify, locate, analyze and/or correct suspected faults in a multi-threaded program during the process of "debugging" a program.

SUMMARY OF THE INVENTION

The present invention resides in a system, method and program product for monitoring changes to data within a critical section of a threaded program being debugged, where the changes are made by code running outside of the critical section. The method includes establishing, using a tool coupled to a debugger, a watch for monitoring changes to a variable that occur outside of the critical section of the threaded program, executing a portion of the threaded program with the debugger, and determining, using the tool coupled to the debugger, whether or not a thread of the threaded program has executed a start breakpoint set for the critical section. If the thread has executed the start breakpoint set for the critical section, determining, using the tool coupled to the debugger, whether or not the thread of the threaded program has executed an end breakpoint set for the critical section, and if the thread has not executed the end breakpoint set for the critical section, displaying any watches triggered responsive to updates to the variable that occur outside of the critical section of the threaded program, wherein only updates to the variable that occur outside of the critical section of the threaded program will trigger the displaying. In an embodiment, if the thread has executed the end breakpoint set for the critical section, ignoring any watches triggered by the thread executing within the critical section. In an embodiment, the establishing step further includes selecting the variable within the critical section of the program to be watched by the tool within the debugger program. In an embodiment, the establishing step further includes identifying a starting line and an ending line of said critical section of said program to be watched, and setting a start breakpoint and an end breakpoint corresponding to said starting line and said ending line identified for said critical section of said program. In an embodiment, determining whether or not the thread of the threaded program has executed the start breakpoint set for the critical section step, further includes adding the thread executing within the critical section to a thread list, wherein the tool ignores any watches generated responsive to the thread being executed within the critical section of the threaded program. In an embodiment, the displaying step further includes reporting a location within the threaded program of any updates to the variable outside of the critical section. In an embodiment, the threaded program is either a multi-threaded program or a single threaded program.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 depicts a data structure for a critical section record list table for monitoring changes to data within a critical section of a threaded program where the changes are made by code running outside of the critical section, in accordance with an embodiment of the present invention.

FIG. 5 depicts a data structure for a break point table for monitoring changes to data within a critical section of a threaded program where the changes are made by code running outside of the critical section, in accordance with an embodiment of the present invention.

FIG. 6 depicts a flowchart outlining the steps performed by a debugging tool for monitoring changes to data within a critical section of a threaded program where the changes are made by code running outside of the critical section, in accordance with an embodiment of the present invention.

DETAILED DESCRIPTION OF THE INVENTION

Figure 1:
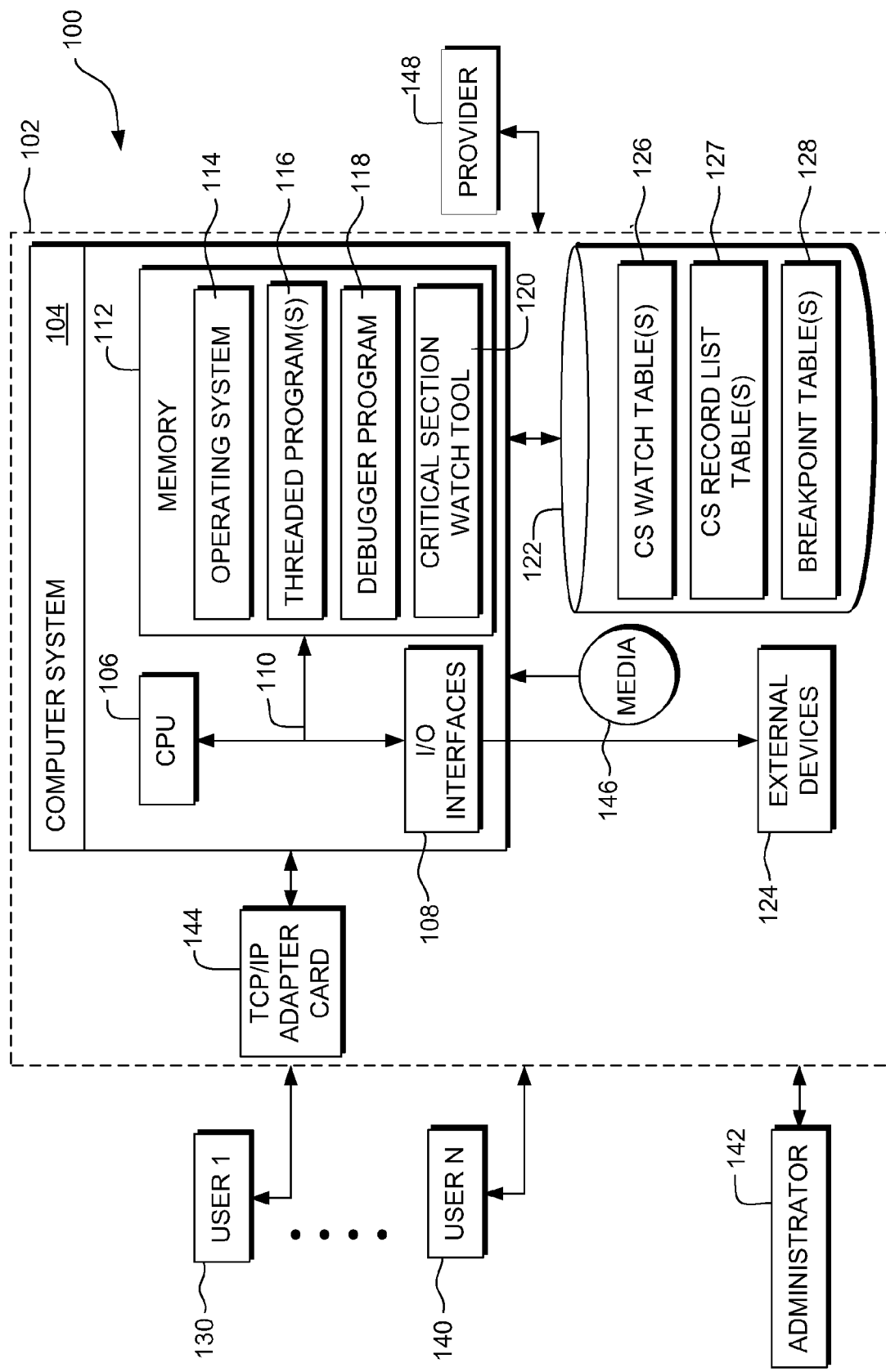
FIG. 1 is a schematic block diagram of a debugging infrastructure having a critical section watch tool deployed thereon for monitoring changes to data within a critical section of a threaded program where the changes are made by code running outside of the critical section, in accordance with an embodiment of the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. Modules may also be implemented in software for execution by various types of processors. An identified module or component of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Further, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, over disparate memory devices, and may exist, at least partially, merely as electronic signals on a system or network. Furthermore, modules may also be implemented as a combination of software and one or more hardware devices. For instance, a module may be embodied in the combination of a software executable code stored on a memory device. In a further example, a module may be the combination of a processor that operates on a set of operational data. Still further, a module may be implemented in the combination of an electronic signal communicated via transmission circuitry.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Moreover, the described features, structures, or characteristics of the invention may be combined in any suitable manner in one or more embodiments. It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents. Reference will now be made in detail to the preferred embodiments of the invention.

Figure 2:
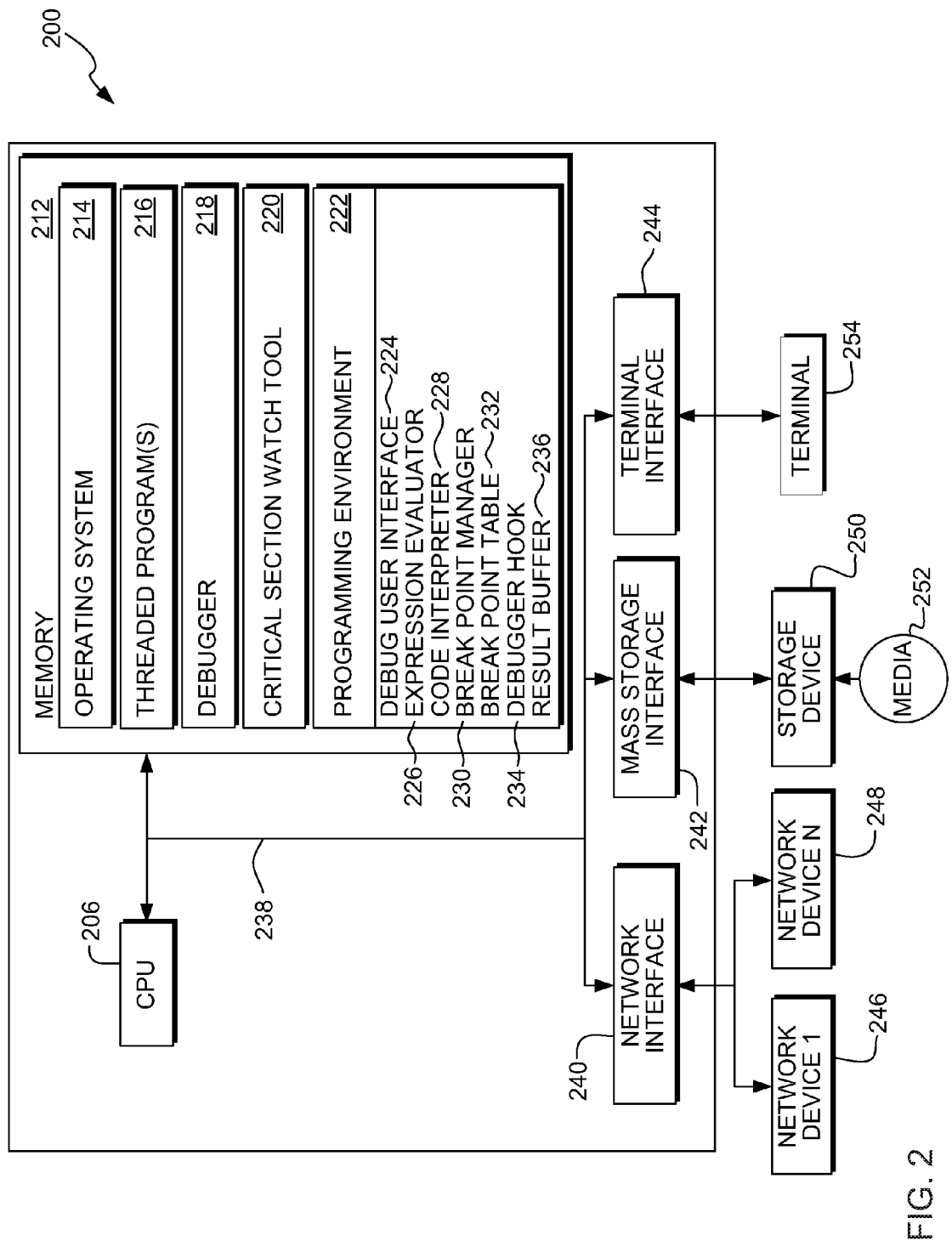
FIG. 2 is a schematic block system diagram illustrating an embodiment of a debugging system having deployed thereon a debugging tool or code for monitoring changes to data within a critical section of a threaded program where the changes are made by code running outside of the critical section, in accordance with an embodiment of the present invention.

Reference is now made to FIGS. 1 and 2, reference numeral 100 and 200, respectively, which illustrate embodiments of a computer infrastructure 102 for monitoring changes to data, for instance, a variable within a critical section of a threaded program that occur as a result of changes made outside of the critical section, in accordance with an embodiment of the invention. Turning to FIG. 1, FIG. 1 depicts a schematic block system diagram illustrating one embodiment of a computer infrastructure 100, which includes computer system 104 configured for monitoring changes to a variable (or storage that stores a piece of information) within a critical section of a threaded program that occur as a result of threads running outside of the critical section. As depicted in FIG. 1, system 100 includes a computer infrastructure 102, which is intended to represent any type of computer architecture that is maintained in a secure environment (i.e., for which access control is enforced). It should be understood, however, that although not shown, other hardware and software components (e.g., additional computer systems, routers, firewalls, etc.) could be included in infrastructure 102. As shown, infrastructure 102 includes a computer system 104 that typically represents a debugging server or system 104 or the like that includes at least one central processing unit (CPU) or processor 106, which obtains instructions, or op codes, and data via a network from main memory 112. Further, the main memory 112 includes an operating system 114, which in an embodiment, comprises an operating system configured to run multi-threaded programs in a computer system, such as, the IBM® i5 operating system used on an IBM Power Systems computers or the IBM® z series operating system used for mainframe computers. The IBM® i5 operating system and the IBM® z series operating system are both commercially available from International Business Machines Corporation (IBM). Further, the main memory 112 of computer system 100 has stored thereon a threaded program 116, which in an embodiment, comprises a multi-threaded program being debugged by the computer system 104. However, it is understood by one skilled in the art that the invention may be used in conjunction with a single threaded program for detecting areas of interest to a programmer, where a variable is not being updated correctly. As shown in FIG. 1, the main memory 112 further has deployed thereon a debugger program (also referred to herein as a debugging program or simply a debugger) 118 for debugging the threaded program 116. In an embodiment, the debugger 118 includes a critical section watch tool 120 (also referred to herein as the debugging tool), which is discussed further herein below with respect to FIG. 3. Although, the critical section watch tool 120 is shown incorporated within the debugger 118, it is understood by one skilled in the art that the critical section watch tool 120 may be designed as a separate plug-in to the debugger 118.

Reference is now made to FIG. 2, reference numeral 200, which depicts a schematic block system diagram illustrating one embodiment of a computer system 200 for monitoring changes to a variable within a critical section of a threaded program 216 being debugged by a debugger 218 running on operating system 214 within a main memory 212 of critical section 200. In an embodiment, the debugger program 218 is stored within a main memory 212 of the computer system 204. In an embodiment, shown in FIG. 2, the debugger program 218 includes a critical section watch tool 220 for monitoring changes to a variable within the critical section of the threaded program 216 being debugged, in accordance with an embodiment of the invention. Computer system 200 includes at least one central processing unit (CPU) or processor 206 which obtains instructions, or op codes, and data via a network from main memory 212. The processor 206 could be a PC-based server, a minicomputer, a midrange computer, a mainframe computer, etc. Further, the main memory 212 includes a programming environment 222 that provides a mechanism to debug the threaded program 216. In an embodiment, the programming environment 222 includes a debug user interface 224, an expression evaluator 226, a code interpreter 228, a break point manager 230, a break point table 232, a debugger hook 234, and a result buffer 235. The threads are suspended and released selectively by the break point manager 230. In an embodiment, the main memory 212 comprises a memory device or a combination of memory devices, including Random Access Memory (RAM), nonvolatile or backup memory (e.g., programmable or Flash memories, read-only memories (ROM), etc.). In addition, memory 212 may include memory storage physically located elsewhere in the computer system 200, for instance, any storage capacity used as virtual memory or stored on a mass storage device or on another computer coupled to computer system 200 via network 238. In an embodiment, the computer system 200 may include a number of operators and peripheral systems as shown, for example, a network interface 240 operably connected to a plurality of network devices (network device 1 through network device N, reference numeral 246 through reference numeral 249), a mass storage interface 242 operably connected to a storage device 250, and a terminal interface 244 operably connected to a terminal 254. As shown in FIG. 2, a storage medium or media 252 may be used to load programs into computer system 200. In an embodiment, the terminal 254 and network devices 1 through N can include desktop or PC-based computers, workstations, or network terminals, or other networked computer systems. For purposes of the invention, computer system 200 may represent practically any type of computer, computer system or other programmable electronic device, including a client computer, a server computer, a portable computer, an embedded controller, etc. The computer system 200 may be a standalone device or networked into a larger system.

Referring to the programming environment 222, in an embodiment, the debug user interface 224 provided is used by a user and/or programmer to initiate a critical section watch for a variable within the critical section. For example, a programmer uses a WATCH command provided within the debugger 218 to select a variable (for instance, variable A) to be watched and then selects the starting line or statement and the ending line or statement of the critical section (for example, line 23 and line 41), which in an embodiment, may be entered as WATCH A CS(23,41), such that, threads executing between these statements or lines are allowed to update the variable. Accordingly, memory addresses may be cross referenced from the statement number references provided in the command. The watch command entered by a user is parsed by the expression evaluator 226 that uses a break point table 232 (further discussed herein below with respect to FIG. to map the line number in the watch command to the actual physical storage address in memory 212. The code interpreter 228 passes on the synchronization control point or break point information to the break point manager 230, which in turn updates the break point table 232. The code interpreter 228 runs a code program to control the break point manager 230 to set the control points. In some instances, the user may define these control points by referring to high-order language (HOL) references, such as, line or statement numbers or software object references, such as, a program or module name, from which the physical storage address may be cross referenced. After the control points are set, the user or programmer provides an input that resumes execution of the threaded program 216. Execution of the program eventually results in an encounter of a control point, which causes a system exception. An interrupt handler, or similar means, passes information regarding the exception or interrupt to the break point manager 230. The break point manager 230 references and updates the break point table 232 as required in order to track a break point where a variable within a critical section has been updated by a thread executing outside of the critical section. If such a break point is recognized, then the break point manager 230 triggers displaying of the break point by halting execution of the multi-threaded computer program. Further, the break point manager 230 also enables program execution to recommence after appropriate measures have been taken. In an embodiment, the break point manager 230 utilizes the debugger hook 234 in order to obtain debugger commands, for instance, for resuming execution of a program when a break point has halted program execution. The debugger hook 234 prompts the debug user interface 224 when required and, further, the debugger hook 234 utilizes the result buffer 236 to cache data for the debug user interface 224.

Referring back to FIG. 1, as shown, one or more programmer or users, for instance, user 1 (reference numeral 130) through user N (reference numeral 140) may access the debugging server or system 104, which has deployed thereon the critical section watch tool 120, which implements the invention. The critical section watch tool or program 120 is run on the server 104 to debug a threaded program and, in particular, to monitor changes to a variable within the critical section that occur as a result of threads running outside of the critical section. The debugger program 118 running on the debugging server or system 104 is configured to invoke the critical section watch tool 120 for monitor changes to a variable within the critical section that occur as a result of threads running outside of the critical section.

Further, as shown in FIG. 1, the debugging server or system 104 (which has implemented thereon the critical section watch tool 120) is shown in communication with a general storage or file system 122, which stores, in an embodiment, critical section watch table(s) 126, critical section record list table(s) 127 and breakpoint table(s) 128. In particular, a user 1 (reference numeral 130 through user N, reference numeral 140) accesses the debugging server or system 104 over a network via interfaces (e.g., web browsers) loaded on a client, for example, a personal computer, a laptop, a handheld device, etc. In the case of the latter, the network can be any type of network such as the Internet, a local area network (LAN), a wide area network (WAN), a virtual private network (VPN), etc. In any event, communication with infrastructure 102 could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, the parties could utilize an Internet service provider to establish connectivity to infrastructure 102. It should be understood that under the present invention, infrastructure 102 could be owned and/or operated by a party such as a third-party provider 148, or by an independent entity. Regardless, use of infrastructure 102 and the teachings described herein could be offered to the parties on a subscription or fee-basis. In either scenario, an administrator 142 could support and configure infrastructure 102, for instance, upgrading the critical section watch tool 120 in the debugging server or system 104.

The debugging system or server 104 is further shown to include a bus 110, and input/output (I/O) interfaces 108. Further, the server 104 is shown in communication with external I/O devices/resources 124 and storage system 122. In general, processing unit 106 executes computer program code, such as, the operating system 114, the threaded programs 116, the debugger 118 and the critical section watch tool 120. While executing computer program code, the processing unit 106 can read and/or write data to/from memory 112, storage system 122, and/or I/O interfaces 108. For instance, in one embodiment, the critical section watch tool 120 stores one or more critical section watch table(s) 126 in storage 122. Similarly, the critical section watch tool 120 stores any record list table(s) 127 and break point table(s) 128 in local storage 122. Alternatively, the watch table(s) 126, record list table(s) 127 and break point table(s) may be stored in a separate storage within the system 104. Bus 110 provides a communication link between each of the components in computer system 100, such that information can be communicated within the infrastructure 102. External devices 124 can comprise any devices (e.g., keyboard, pointing device, display, etc.) that enable a user to interact with computer system 100 and/or any devices (e.g., network card, modem, etc.) that enable server 104 to communicate with one or more other computing devices. Computer infrastructure 102 is only illustrative of various types of computer infrastructures for implementing the invention. For example, in an embodiment shown, computer infrastructure 102 comprises two or more computing devices (e.g., a server cluster) that communicate over a network to perform the various process steps of the invention. Moreover, computer system 100 is only representative of various possible computer systems that can include numerous combinations of hardware. To this extent, in other embodiments, computer system 100 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server.

Similarly, memory 112 and/or storage system 122 can comprise any combination of various types of computer-readable data storage that reside at one or more physical locations. Further, I/O interfaces 108 can comprise any system for exchanging information with one or more external devices 124. Still further, it is understood that one or more additional components (e.g., system software, math co-processing unit, etc.) not shown in FIG. 1 can be included in computer system 100. However, if computer system 100 comprises a handheld device or the like, it is understood that one or more external devices 124 (e.g., a display) and/or storage system(s) 122 could be contained within computer system 104, and not externally as shown. Storage system 122 can be any type of system (e.g., a database) capable of providing computer-readable storage for information under the present invention. To this extent, storage system 122 could include one or more computer-readable storage devices, such as a magnetic disk drive or an optical disk drive. In another embodiment, storage system 122 includes data distributed across, for example, a local area network (LAN), wide area network (WAN) or a storage area network (SAN) (not shown). Although not shown, additional components, such as cache memory, communication systems, system software, etc., may be incorporated into computer system 100. The terms "computer-readable storage device" and "computer-readable storage devices" do not include signal propagation media.

Accordingly, as shown in FIG. 1, there is illustrated a system 100 that provides a computer program product for monitoring changes to a variable that occur outside of the critical section of a threaded program, in accordance with an embodiment of the present invention. The computer program product comprises a computer readable or computer-usable storage medium, which provides program code, namely, the critical section watch tool 120, for use by or in connection with a computer or any instruction execution system. The critical section watch tool or program 120 can be loaded into computer system 104 from a computer readable media 146, such as, a magnetic tape or disk, optical media, DVD, memory stick, semiconductor memory, etc. or downloaded from the Internet via a TCP/IP adapter card 144.

Figure 3:
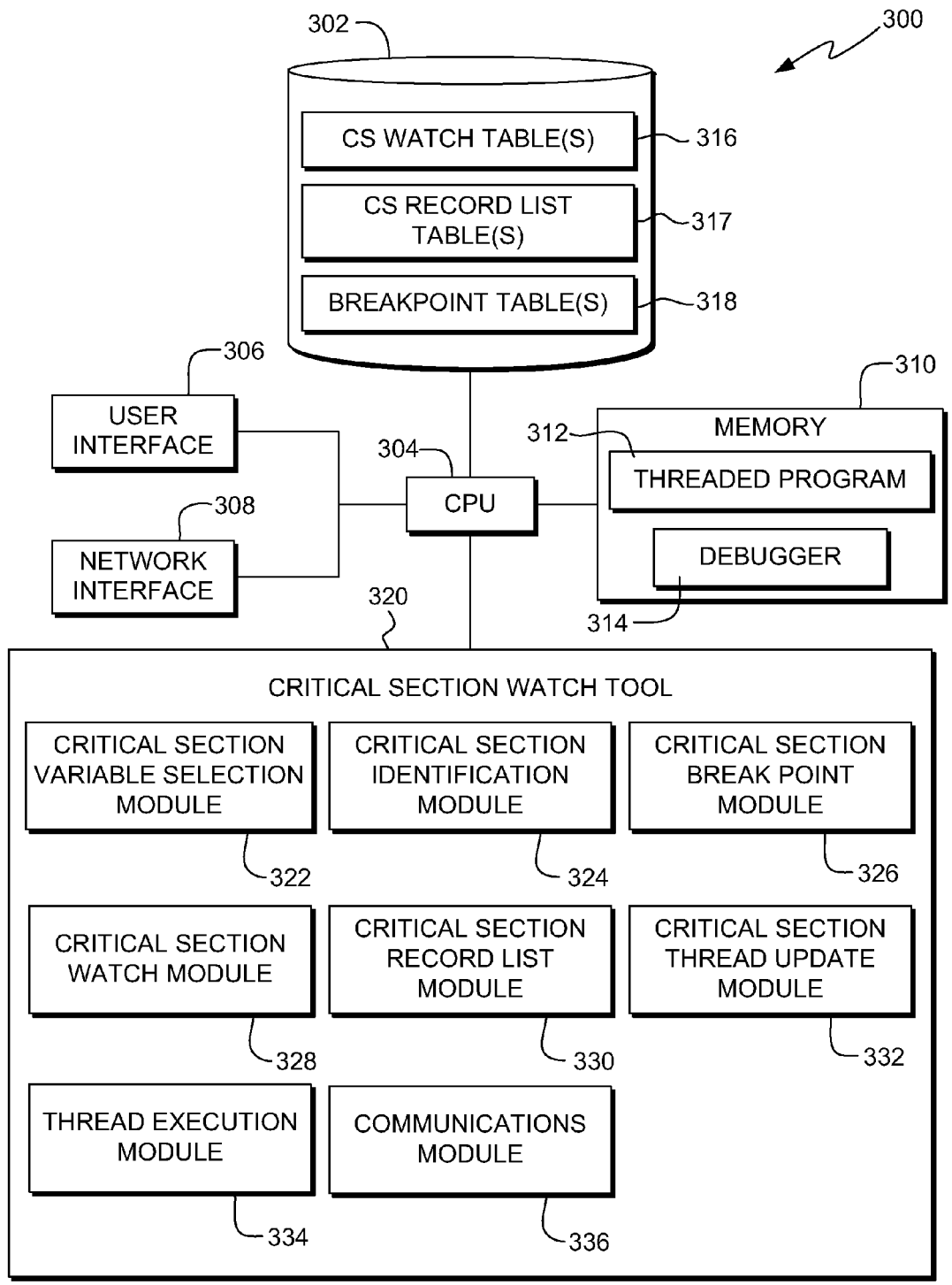
FIG. 3 depicts a data structure for a critical section watch table for monitoring changes to data within a critical section of a threaded program where the changes are made by code running outside of the critical section, in accordance with an embodiment of the present invention.

Reference is now made to FIG. 3, reference numeral 300, which depicts a schematic block system diagram illustrating one embodiment of a computer system 300, such as, a server that has deployed thereon or is coupled to a system that has deployed thereon a critical section watch tool or code 320 configured to automatically monitor changes to a critical section of a threaded program, such that, only updates or changes to a variable within the critical section that occur outside of the critical section will trigger the watch. As shown in FIG. 3, the server or system 300 comprises a central processing unit (CPU) 304, a local storage device 302, a user interface 306, a network interface 308 and a memory 310. The CPU 304 is configured generally to execute operations within the system/server 300, such as, the threaded program 312 and the debugger program 314, which in an embodiment, are stored in memory 310. The network interface 306 is configured, in one embodiment, to facilitate network communications of the system 300 over a communications channel of a network. In one embodiment, as shown in FIG. 3, the critical section watch tool 320 comprises a logic unit that contains a plurality of modules configured to functionally execute the necessary steps for automatically monitoring changes to a variable within a critical section of a threaded program, such that only updates to the variable that occur outside of the critical section of the threaded program will trigger displaying any watches triggered responsive to updates to the variable. In particular, the critical section watch tool or code 320 comprises a critical section variable selection module 322, a critical section selection module 324, a critical section break point module 326, a critical section watch module 328, a critical section record list module 330, a critical section thread update module 332, a thread execution module 334, and a communications module 342.

Referring to FIG. 3, the critical section variable selection module 322 of the critical section watch tool or code 320 is configured to select a variable within a critical section that is of interest to a user or programmer. As such, the user or programmer selects or chooses a variable within the critical section that is to be monitored by the critical section watch tool 320. The critical section identification module 324 is configured to select or establish or identify a starting line of a critical section and an ending line of the critical section. The critical section break point module 326 is configured to set special internal break points, such that, a debugger can identify when a particular thread is executing within the critical section and can ignore any watches produced as a result of the particular thread executing within the critical section. In an embodiment, the critical section break point module 326 is configured to display break point information in break point table(s) 318, which in an embodiment, are stored by the critical section watch tool 320 in the local storage 302. Break point table(s) are discussed further herein below with respect to FIG. 5. The critical section watch module 328 is configured to establish a watch table that lists all the watches produced by threads executing within the critical section, as explained further herein below with respect to FIG. 3. In an embodiment, the critical section watch tool 320 stores any watch table(s) 316 created by the critical section watch module 328 in a local storage, such as, storage 302. The critical section record list module 330 is configured to establish a record list table 317 (shown in storage 302) that lists details of one or more critical sections being monitored, as explained further herein below with respect to FIG. 4. In an embodiment, the critical section watch tool 320 stores any record list table(s) 317 created by the critical section watch module 328 in the local storage 302. The critical section thread update module 332 is configured to monitor changes to a variable that occur as a result of a thread executing outside of the critical section of the threaded program. The thread execution module 334 is configured to start and stop execution of a thread within the critical section when debugging the threaded program. The communications module 336 is configured to permit communication between the various modules of the critical section watch tool or code 320 and other systems, such as, the storage 302 and memory 310. In an embodiment, the storage module 336 stores updated data pertaining to services, service providers, consumers and/or client devices in a storage system, such as, the storage 302.

Reference is now made to FIGS. 4 through 6, which depict various embodiments of the invention for monitoring changes to a variable that occur outside of the critical section of a threaded program, in accordance with an embodiment of the invention. Turning to FIG. 4, reference numeral 400 depicts a data structure for a critical section watch table for monitoring changes to a variable within a critical section caused by threads executing outside of the critical section. In an embodiment, as shown in FIG. 4, the critical section watch table includes a "watch number (#)" column (reference numeral 402), an "address" column (reference numeral 404), a "length" column (reference numeral 406 and a "critical section number (#)" column (reference numeral 408). In particular, the critical section watch table 400 shows two critical section watches that are listed, namely watch number 1 (row 420) and watch number 2 (row 430). In particular, as shown in the critical section number column (reference numeral 408), watch number 1 has an address of 75D13200 listed in the address column 404, whereas, watch number 2 has an address of 75D13100 listed in the address column 404. The address in the address column 404 represents the physical storage location for the instruction. Further, watch number 1 identifies the length of the watch number 1 section being watched, which in this case is 20 bytes (length column 406), whereas, watch number 2 lists the length of the watch number 2 section being watched as 4 bytes. Further, table 400 shows that watch number 1 has a critical section number value of "0" (column 408), whereas, watch number 2 has a critical section number value of "1". In an embodiment, the numeric value listed in the critical section number column 408 of table 400 connects a watch table entry listed for a threaded program being debugged in FIG. 4 to an entry for the threaded program being debugged in the record list table of FIG. 5. Accordingly, as shown in FIGS. 4 and 5, the entry in row 430 is related to the entry in row 530 given that the critical section numeric values are the same, namely, having a critical section # value of 1. As such, watch #1 having a critical section #0 (row 430 in FIG. 4) is not a critical section watch given that there is no corresponding entry for the critical section #0 in the Record List table 500 of FIG. 5.

Turning to FIG. 5, reference numeral 500 depicts a data structure for a critical record list table for monitoring changes to a variable within a critical section caused by threads executing outside of the critical section. In an embodiment, as shown in FIG. 5, the critical section record list table 500 includes a "critical section number (#)" column (reference numeral 502), a "module" column (reference numeral 504), a "start" column (reference numeral 506), an "end" column (reference numeral 508) and a "thread list" column (reference numeral 510). In an embodiment, as shown in FIG. 5, the critical section number column 502, shows that for a critical section number 1 the module is listed or identified as "Foo" (column 504). Further, the module Foo is shown to have a start line (column 506) that begins at line 23 and an end line (column 508) that ends with line 41. Further, the thread list column 510 provides an entry for each thread that is active within the critical section of a threaded program. In particular, the thread list column 510 further provides a "thread number (#)" (column 512) of the thread that is executing within the critical section of a threaded program. In the example shown in column 512, the thread number is thread 3253. As such, while a thread is within the critical section, the thread will be listed in the record list column, as described further herein below with respect to FIG. 7. Also, given that multiple threads can be running through the same critical section of code, the arrow in the Next column 514 refers to the fact that information can be saved on several threads at once, using the threads listed in the thread list column 510.

Turning to FIG. 6, reference numeral 600 depicts a data structure for a critical section break point table for monitoring changes to a variable within a critical section caused by threads executing outside of the critical section, in accordance with an embodiment of the invention. As discussed herein above, a user may define break points or control points by referring to line numbers or statement numbers or by referring to software object references, such as, a program or module name, from which the physical storage address may be cross referenced. As shown in FIG. 6, the critical section break point table 600 includes an "address" column (reference numeral 602), a "line number" column (reference numeral 604), a "saved op code" column (reference numeral 606), a "Start?" column (reference numeral 608), an "End?" column (reference numeral 610) and a "critical section number (#)" column (reference numeral 612). As shown in row 620, an address in the address column 602 has a value of 712498A1, and is associated with line number 23 (line number column 604). The address shown in the address column 602 represents the physical storage location for the instruction on line 23. Further, the saved op code column 606, which stores the original op code or instruction replaced in the threaded program has a value of "LOAD". It is understood that the LOAD op code or instruction is exemplary and that the instruction could be any other instruction. In embodiment, the op code or instruction LOAD sets up access to read the specific data at the specified address. The "Start?" column 608 shows a value of "yes", whereas the End? column 610 shows a value of "no". Further, the critical section number (#) column 612 shows the value of "1", indicating that this is a critical section watch, as listed in the critical section record list in FIG. 5. Similarly, row 630 shows an address in the address column 602 has a value of 712598B2, and is associated with line number 41 (line number column 604). Further, the saved op code column 606 has a value of "STR". It is understood that the STR op code or instruction is exemplary and that the instruction could be any other instruction. In an embodiment, the saved op code column stores the original op code or instruction that is replaced in the threaded program. In an embodiment, the op code STR writes the specific data loaded to the specified address. The "Start?" column 608 shows a value of "no", whereas the End? column 610 shows a value of "yes". Further, the critical section number (#) column 612 shows the value of "1", indicating that this is a critical section watch, as listed in the critical section record list of FIG. 5. Furthermore, row 640 shows an address in the address column 602 has a value of 722698D2, and is associated with line number 92 (line number column 604). Further, the saved op code column 606 has a value of "STR". In an embodiment, the op code STR writes the specific data loaded to the specified address. The "Start?" column 608 shows a value of "no", and the End? column 610 also shows a value of "no". Further, the critical section number (#) column 612 shows the value of "0", indicating that this is not a critical section watch listed in the critical section record list of FIG. 5. In an embodiment, a break point is implemented by replacing a valid op code or instruction, which is saved by the system, with an invalid op code or instruction that will cause the system to trap. As such, the debugger needs the saved op code or instruction for restoring the op code or instruction that was replaced when the start break point is hit and in order to restore the saved op code when the debugger program resumes control by emulating the op code after the debugger program hits the end break point. It is understood that the tables 400 through 600 are merely for illustration purposes and that modifications can be made to the tables for providing fewer or more types of data. In addition, this information could be contained in one or more data structures of various compositions.

Figure 7:
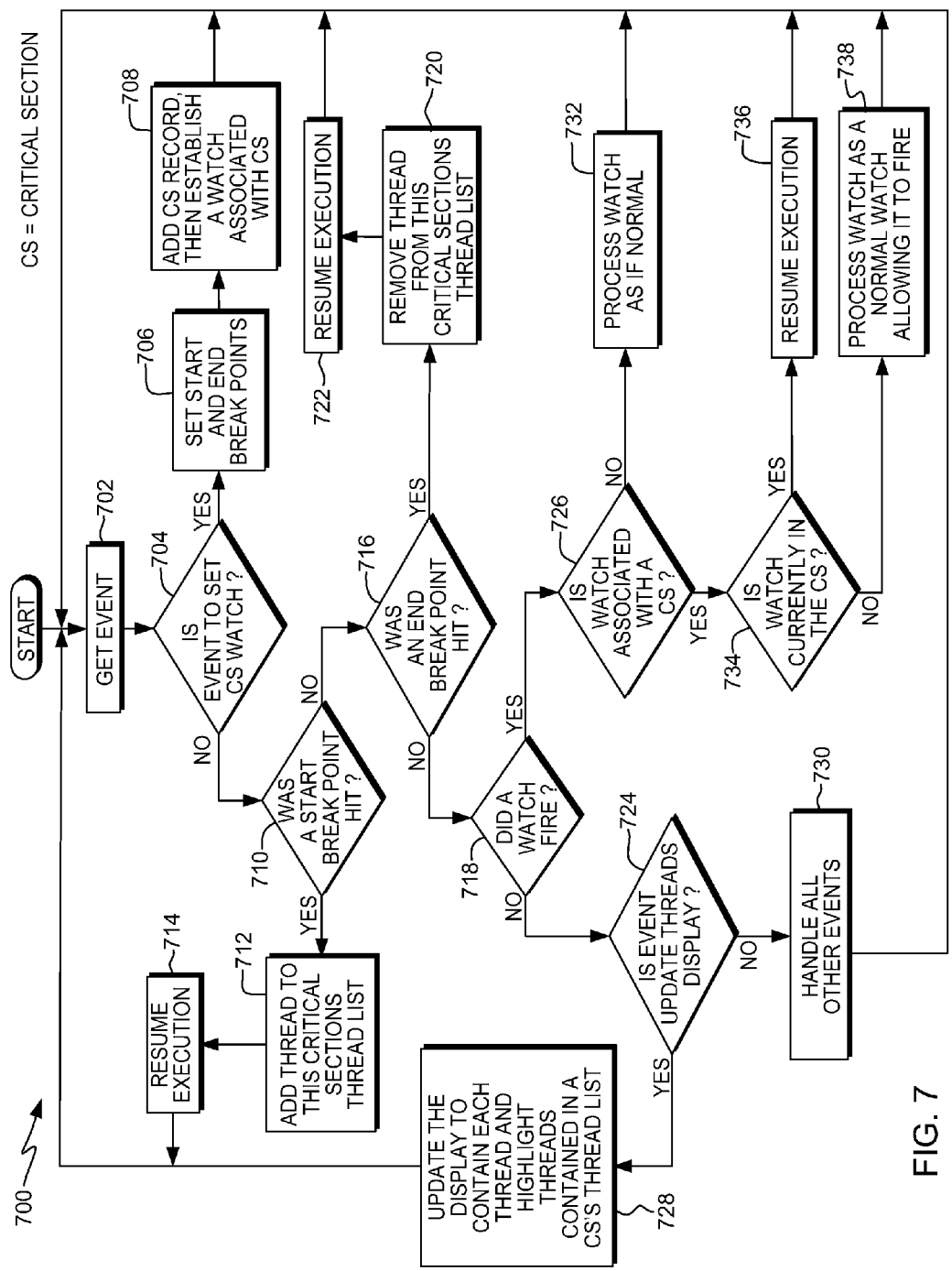

In another embodiment, the invention provides a method for monitoring changes to a variable within a critical section that occur due to threads executing outside the critical section, using a critical section watch tool, in accordance with an embodiment of the present invention. Turning to FIG. 7, reference numeral 700 depicts a method carried out by a debugger that includes an add-on critical section watch tool or debugging tool for monitoring changes to a variable within a critical section of a threaded program, as described herein above. As such, the critical section watch tool coupled to the debugger gets an event in step 702. The critical section watch tool determines in step 704 whether or not the event is to set a critical section watch. If the critical section watch tool determines that the event is to set a critical section watch (Yes branch), then the critical section watch tool sets in step 706 the start break point and the end break point. Further, in step 708, the critical section watch tool adds the critical section record to a record list (as discussed herein above with respect to FIG. 5) and further establishes a watch associated with the critical section, which in an embodiment, is tracked in a watch table (as discussed herein above with respect to FIG. 4). The critical section watch tool returns back to step 702 and gets another event. Referring back to step 704, if the critical section watch tool determines that the event is not to set a critical section watch (No branch), then the critical section watch tool determines in step 710 whether or not a start break point was hit or encountered. If the critical section watch tool determines in step 710 that a start break point was encountered, then the critical section watch tool adds in step 712 the thread executing within the critical section to a thread list associated with that critical section (the critical section record list table shown in FIG. 5) and the critical section watch tool resumes execution of the threaded program in step 714, and returns to step 702. Accordingly, when a break point is hit, the debugger records the thread that has hit a start break point by adding it to the list shown in FIG. 5, thus, getting control of the debugger, and by removing the break point when an end break point is encountered. However, back in step 710, if the critical section watch tool determines that a start break point was not encountered, then the critical section watch tool determines in step 716 whether or not an end break point was hit or encountered. If the critical section watch tool determines in step 716 that an end break point was encountered (yes branch), then the critical section watch tool removes in step 720 the thread from the thread list associated with that critical section. The critical section watch tool resumes execution in step 722, and returns to step 702. However, in step 716, if the critical section watch tool determines that an end break point was not encountered, then the critical section watch tool determines in step 724 whether or not a watch fired. If the critical section watch tool determines in step 718 that a watch did fire, then the critical section watch tool further determines in step 726 whether or not the watch is associated with a critical section listed in the watch table. If the critical section watch tool determines in step 726 that the watch is not associated with a critical section, then the critical section watch tool processes in step 732 the watch as if a normal watch, that is, the watch is presented or displayed to the debugger user and the process returns to step 702. On the other hand, if the critical section watch tool determines in step 726 that the watch is associated with a critical section, then the critical section watch tool further determines in step 734 whether or not the watch is currently within the critical section. If the critical section watch tool determines in step 734 that the watch is currently within the critical section (yes branch), then the critical section watch tool resumes execution in step 736, that is, the watch is ignored, and the process returns to step 702. However, if the critical section watch tool determines in step 734 that the watch is not currently within the critical section (no branch), then the critical section watch tool processes in step 738 the watch as a normal watch, allowing the watch to fire and bringing the watch to the debugger user's attention. The process returns to step 702. Going back to step 718, if the critical section watch tool determines that a watch did not fire, then the critical section watch tool further determines in step 724 whether or not the event is to update the threads display in the critical section record list in FIG. 5. If the critical section watch tool determines in step 724 that the event is to update the threads display, then the critical section watch tool updates in step 728 the display to contain each thread and highlights threads contained in the critical section's thread list, and the process returns to step 702. However, if the critical section watch tool determines in step 724 that the event is not to update the threads display, that is, the event pertains to other events unrelated to the monitoring of changes to data in a critical section, then the critical section watch tool handles in step 730 these other events and the process returns to step 702.

Accordingly, the critical section watch tool coupled to the debugger is used to selectively monitor changes to a protected variable that occur outside of the critical section, while the critical section is active. A user or programmer sets a watch for monitoring a variable by selecting the protected variable to watch and then selecting the lines that establish the start and end break points of the critical section. As such, the critical section watch tool coupled to the debugger monitors the variable by first determining whether or not a thread has executed the line selected to be the start line of the critical section and then by further determining that the thread has not yet executed the critical section end line, thus, any changes to the protected variable can be ignored. Thus, only changes to the protected variable that occur outside of the critical section will trigger or fire the watch, increasing the effectiveness of the watch command. Watches will fire as values are stored to that variable, but the program will determine whether or not the thread is within the critical section and, if the thread is, it will not tell the user about the change to the variable and will just let the program resume. In addition, when a watch fires, it will not only report the variable and location of the change, but will also highlight the threads that are currently in the critical section on the threads display in the threads list.

The foregoing descriptions of specific embodiments of the present invention have been presented for the purpose of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A method for monitoring changes to a value of a program variable within a threaded program which comprises different program threads configured for concurrent execution, the threaded program not changing the value of the program variable outside a predetermined section of the threaded program if the different program threads are properly synchronized with each other, the method comprising the steps of:
   a debugger program setting a first break point for a start of the predetermined section, and setting a second break point for an end of the predetermined section;
   the debugger program receiving a command to monitor for the changes to the value of the program variable;
   the debugger program initiating execution of the threaded program, and during the execution of the threaded program a program tool coupled to the debugger program monitoring execution of the threaded program;
   responsive to a change to the value of the program variable by one of the program threads in the different program threads, the program tool identifying the change to the value of the program variable, within the threaded program, resulting from the execution of the one program thread in the threaded program;
   the program tool determining whether the change to the value of the program variable occurred between the start and the end of the predetermined section of the threaded program or outside the start and the end of the predetermined section based on whether the change occurs while the one program thread is executing between the first break point and the second break point; and
      if the one program thread has changed the value of the program variable between the start and the end of the predetermined section, the program tool does not indicate an error due to the change in the value of the program variable, and
      if the one program thread has changed the value of the program variable outside the start and the end of the predetermined section, the program tool indicating a potential error condition.

2. The method according to claim 1, further comprising the steps of:
   the program tool receiving from a user a specification of the start and the end of the predetermined section of the threaded program by specification of respective start and end instructions within the threaded program.

3. The method according to claim 2, further comprises the step of:
   the program tool receiving from a user a specification of the program variable.

4. The method according to claim 1, wherein the step of the program tool identifying the change to the value of the program variable, within the threaded program, resulting from the execution of the one program thread in the threaded program comprises the step of the program tool identifying and monitoring the one program thread.

5. The method according to claim 1, wherein the one program thread in the threaded program changes the value of the program variable outside the predetermined section, and in response, further comprising the step of the program tool reporting a location within the threaded program at which the one program thread changed the program variable outside the predetermined section.

6. A computer system for monitoring changes to a value of a program variable within a threaded program which comprises different program threads configured for concurrent execution, the threaded program not changing the value of the program variable outside a predetermined section of the threaded program if the different program threads are properly synchronized with each other, the computer system comprising:
   one or more processors, one or more computer-readable memories, one or more computer-readable storage devices, and program instructions stored on at least one of the one or more storage devices for execution by at least one of the one or more processors via at least one of the one or more memories, the program instructions comprising:
   program instructions to set a first break point for a start of the predetermined section, and set a second break point for an end of the predetermined section;
   program instructions to receive a command to monitor for the changes to the value of the program variable;
   program instructions to initiate execution of the threaded program in a debugging process;
   program instructions, operable during the execution of the threaded program, to monitor execution of the threaded program;
   program instructions, responsive to a change to the value of the program variable by one of the program threads in the different program threads, to identify the change to the value of the program variable, within the threaded program, resulting from the execution of the one program thread in the threaded program;
   program instructions to determine whether the change to the value of the program variable occurred between the start and the end of the predetermined section of the threaded program or outside the start and the end of the predetermined section based on whether the change occurs while the one program thread is executing between the first break point and the second break point; and
      if the one program thread has changed the value of the program variable between the start and the end of the predetermined section, the computer system does not indicate an error due to the change in the value of the program variable, and
      if the one program thread has changed the value of the program variable outside the start and the end of the predetermined section, the monitoring program instructions indicate a potential error condition.

7. The computer system according to claim 6, further comprising:
   program instructions, stored on at least one of the one or more storage devices for execution by at least one of the one or more processors via at least one of the one or more memories, to receive from a user a specification of the start and the end of the predetermined section of the threaded program by specification of respective start and end instructions within the threaded program.

8. The computer system according to claim 7, further comprising:
   program instructions, stored on at least one of the one or more storage devices for execution by at least one of the one or more processors via at least one of the one or more memories, to receive from a user a specification of the program variable.

9. The computer system according to claim 6, wherein the monitoring program instructions monitor the one program thread.

10. The computer system according to claim 6, wherein the one program thread in the threaded program changes the value of the program variable outside the predetermined section, and in response, the monitoring program instructions report a location within the threaded program at which the one program thread changed the program variable outside the predetermined section.

11. A computer program product for monitoring changes to a value of a program variable within a threaded program which comprises different program threads configured for concurrent execution, the threaded program not changing the value of the program variable outside a predetermined section of the threaded program if the different program threads are properly synchronized with each other, the computer program product comprising:
  one or more computer-readable storage devices and program instructions stored on at least one of the one or more storage devices, the program instructions comprising:
  program instructions to set a first break point for a start of the predetermined section, and set a second break point for an end of the predetermined section;
  program instructions to receive a command to monitor for the changes to the value of the program variable;
  program instructions to initiate execution of the threaded program in a debugging process;
  program instructions, operable during the execution of the threaded program, to monitor execution of the threaded program;
  program instructions, responsive to a change to the value of the program variable by one of the program threads in the different program threads, to identify the change to the value of the program variable, within the threaded program, resulting from the execution of the one program thread in the threaded program;
  program instructions to determine whether the change to the value of the program variable occurred between the start and the end of the predetermined section of the threaded program or outside the start and the end of the predetermined section based on whether the change occurs while the one program thread is executing between the first break point and the second break point; and
    if the one program thread has changed the value of the program variable between the start and the end of the predetermined section, the computer system does not indicate an error due to the change in the value of the program variable, and
    if the one program thread has changed the value of the program variable outside the start and the end of the predetermined section, the monitoring program instructions indicate a potential error condition.

12. The computer program product according to claim 11, further comprising:
  program instructions, stored on at least one of the one or more storage devices, to receive from a user a specification of the start and the end of the predetermined section of the threaded program by specification of respective start and end instructions within the threaded program.

13. The computer program product according to claim 11, further comprising:
  program instructions, stored on at least one of the one or more storage devices, to receive from a user a specification of the program variable.

14. The computer program product according to claim 11, wherein the monitoring program instructions monitor the one program thread.

15. The computer program product according to claim 11, wherein the one program thread in the threaded program changes the value of the program variable outside the predetermined section, and in response, the monitoring program instructions report a location within the threaded program at which the one program thread changed the program variable outside the predetermined section.

16. The method of claim 1, wherein responsive to receiving the command to monitor for the changes to the value of the program variable, the debugger program sets a watch for the changes to the program variable, and wherein the program tool identifying the change to the value of the program variable is further responsive to the change to the value of the program variable triggering the watch.

17. The method of claim 1, wherein the command further specifies that any change to the value of the program variable is allowed when the change occurs between the start and the end of the predetermined section.

* * * * *